US008099132B2

(12) United States Patent
Kim et al.

(10) Patent No.: US 8,099,132 B2
(45) Date of Patent: Jan. 17, 2012

(54) ANTENNA SWITCHING AND UPLINK SOUNDING CHANNEL MEASUREMENT

(75) Inventors: Byoung-Hoon Kim, Seoul (KR); Durga Prasad Malladi, San Diego, CA (US); Juan Montojo, San Diego, CA (US); Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 665 days.

(21) Appl. No.: 12/190,386

(22) Filed: Aug. 12, 2008

(65) Prior Publication Data

US 2009/0054093 A1  Feb. 26, 2009

Related U.S. Application Data

(60) Provisional application No. 60/956,076, filed on Aug. 15, 2007.

(51) Int. Cl.
*H04M 1/00* (2006.01)
(52) U.S. Cl. .................. 455/562.1; 455/101; 455/575.7; 455/67.11; 455/67.13; 370/320; 370/335; 370/329; 370/342; 375/267; 375/299; 375/278
(58) Field of Classification Search .............. 455/562.1, 455/63.1, 101, 501, 575.7, 450, 452.2, 67.11, 455/67.13; 375/278; 370/334, 332, 314, 370/335, 342, 344
See application file for complete search history.

(56) References Cited

U.S. PATENT DOCUMENTS

| 6,570,527 | B1 * | 5/2003 | Lindskog et al. | 342/174 |
| 6,738,020 | B1 * | 5/2004 | Lindskog et al. | 342/377 |
| 7,027,523 | B2 * | 4/2006 | Jalali et al. | 375/296 |
| 7,039,016 | B1 * | 5/2006 | Lindskog et al. | 370/252 |
| 7,251,469 | B2 * | 7/2007 | Sudo | 455/342 |
| 7,315,529 | B2 * | 1/2008 | Castelain et al. | 370/335 |
| 7,315,530 | B2 * | 1/2008 | Castelain et al. | 370/335 |
| 7,328,033 | B2 * | 2/2008 | Rappaport et al. | 455/500 |
| 7,359,466 | B2 * | 4/2008 | Huang et al. | 375/349 |
| 7,463,576 | B2 * | 12/2008 | Krishnan et al. | 370/203 |

(Continued)

FOREIGN PATENT DOCUMENTS

EP    1551143 A1    7/2005

(Continued)

OTHER PUBLICATIONS

Abdulla A Abouda et al: "Reducing Impact of Phase Noise on Accuracy of Measured MIMO Channel Capacity" Vehicular Technology Conference, 2007. VTC2007-Spring. IEEE 65th, IEEE, PI, Apr. 1, 2007, pp. 450-454, XP031092670 ISBN: 978-1-4244-0266-3 p. 450, right-hand column, Sectfom II figure 1.

(Continued)

*Primary Examiner* — Marceau Milord
(74) *Attorney, Agent, or Firm* — Jimmy Cheng

(57) ABSTRACT

Systems and methodologies are described that facilitate employing downlink precoding based on uplink sounding channel measurement and channel reciprocity in time division duplex or time division multiplex systems. In particular, mechanism are provided that enable downlink precoding in situations where user equipment antenna configuration includes an unequal number of transmit chains and receive chains. A mobile device transmits modulated sounding reference signals on each antenna during a calibration stage. The mobile device then transmits non-modulated sounding reference signals during a normal mode. A base station utilizes the modulated and non-modulated sounding reference signals to restore a downlink channel estimate employed in downlink precoding.

40 Claims, 12 Drawing Sheets

U.S. PATENT DOCUMENTS

| | | | |
|---|---|---|---|
| 7,573,851 B2 * | 8/2009 | Xing et al. | 370/334 |
| 7,633,905 B1 * | 12/2009 | Harel et al. | 370/334 |
| 7,649,954 B2 * | 1/2010 | Walton et al. | 375/267 |
| 7,747,221 B2 * | 6/2010 | Lee | 455/63.1 |
| 7,747,250 B2 * | 6/2010 | Larsson et al. | 455/424 |
| 7,756,099 B2 * | 7/2010 | Tao et al. | 370/344 |
| 7,831,232 B2 * | 11/2010 | Nakaya | 455/277.1 |
| 7,839,810 B2 * | 11/2010 | Zhang et al. | 370/310 |
| 7,860,176 B2 * | 12/2010 | Wu et al. | 375/260 |
| 7,885,618 B1 * | 2/2011 | Karmi | 455/101 |
| 2003/0185310 A1 * | 10/2003 | Ketchum et al. | 375/259 |
| 2003/0224750 A1 * | 12/2003 | Sampath | 455/276.1 |
| 2006/0120395 A1 * | 6/2006 | Xing et al. | 370/431 |

FOREIGN PATENT DOCUMENTS

| | | |
|---|---|---|
| WO | WO03001761 A1 | 1/2003 |
| WO | WO2007051192 | 8/2009 |

OTHER PUBLICATIONS

Han Zhang et al: "Analysis of pilot-symbol aided channel estimation for MIMO-OFDM systems" Communications, Circuits and Systems, 2004. ICCAS 2004. 2004 Internat Ional Conference on Chengdu, China Jun. 27-29, 2004, Piscataway, NJ, USA,IEEE, US, Jun. 27, 2004, pp. 299-303VO1.1, XP0T0732184 ISBN: 978-0-7803-8647-1 pp. 300-301, Section II . B.

International Search Report and the Written Opinion—PCT/US2008/073289, International Search Authority—European Patent, Office—Mar. 26, 2009.

European Search Report - EP11173646 - Search Authority—Munich (072148EPD1).

* cited by examiner

ANTENNA SWITCHING AND UPLINK SOUNDING CHANNEL MEASUREMENT

CROSS-REFERENCE TO RELATED APPLICATIONS

This application claims the benefit of U.S. Provisional Patent application Ser. No. 60/956,076 entitled "ANTENNA SWITCHING AND UPLINK SOUNDING CHANNEL MEASUREMENT BASED DOWNLINK PRECODING IN TDD SYSTEMS" which was filed Aug. 15, 2007. The entirety of the aforementioned application is herein incorporated by reference.

BACKGROUND

I. Field

The following description relates generally to wireless communications, and more downlink precoding and beamforming in time dimension duplex systems based on antenna switched uplink sounding measurements.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a spatial dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates downlink precoding in antenna configurations with unequal number of transmit and receive chains is provided. The method can comprise transmitting a modulated sounding reference signal on each antenna in a plurality of antennas, the modulated sounding reference signal compensates for discrepancies in device transfer functions between downlink and uplink. The method can also include transmitting a non-modulated sounding reference signal on each antenna in the plurality of antennas. In addition, the method can include alternately connecting a transmit chain to each antenna in the plurality of antennas to facilitate transmission of sounding reference signals on the plurality of antennas.

Another aspect relates to a wireless communications apparatus. The wireless communications apparatus can include a memory that retains instructions related to transmitting a modulated sounding reference signal on each antenna in a plurality of antennas, the modulated sounding reference signal compensates for discrepancies in device transfer functions between downlink and uplink, transmitting a non-modulated sounding reference signal on each antenna in the plurality of antennas and alternately connecting a transmit chain to each antenna in the plurality of antennas to facilitate transmission of sounding reference signals on the plurality of antennas. In addition, the wireless communications apparatus can also include a processor, coupled to the memory, configured to execute the instructions retained in the memory.

Yet another aspect relates to a wireless communications apparatus that facilitates downlink precoding in antenna configurations with unequal number of transmit and receive chains. The wireless communications apparatus can comprise means for transmitting a modulated sounding reference signal on each antenna in a plurality of antennas, the modulated sounding reference signal compensates for discrepancies in device transfer functions between downlink and uplink. The wireless communications apparatus can further include means for transmitting a non-modulated sounding reference signal on each antenna in the plurality of antennas. In addition, the wireless communications apparatus can also include means for alternately connecting a transmit chain to each antenna in the plurality of antennas to facilitate transmission of sounding reference signals on the plurality of antennas.

Still another aspect relates to a computer program product, which can have a computer-readable medium include code for causing at least one computer to transmit a modulated sounding reference signal on each antenna in a plurality of antennas, the modulated sounding reference signal compensates for discrepancies in device transfer functions between downlink and uplink. The computer-readable medium can also comprise code for causing at least one computer to transmit a non-modulated sounding reference signal on each antenna in the plurality of antennas. In addition, the computer-readable medium can include code for causing at least one computer to alternately connect a transmit chain to each antenna in the plurality of antennas to facilitate transmission of sounding reference signals on the plurality of antennas.

Still yet another aspect relates to an apparatus in a wireless communications system. The apparatus can comprise a processor configured to transmit a modulated sounding reference signal on each antenna in a plurality of antennas, the modulated sounding reference signal compensates for discrepancies in device transfer functions between downlink and uplink. The processor can be further configured to transmit a non-modulated sounding reference signal on each antenna in the plurality of antennas. In addition, the processor can be configured to alternately connect a transmit chain to each antenna in the plurality of antennas to facilitate transmission of sounding reference signals on the plurality of antennas.

According to yet another aspect, a method that facilitates downlink precoding based on sounding channel measurement in user equipment antenna configuration with unequal number of transmit and receive chains is described herein. The method can comprise receiving modulated sounding reference signals, the received modulated sounding reference signals are received from each antenna among a plurality of antennas of a mobile device. The method can further include receiving non-modulated sounding reference signals from each antenna among the plurality of antennas of the mobile device. In addition, the method can comprise restoring downlink channel information utilizing the modulated sounding reference signals and the non-modulate sounding reference signals. The method can also include performing downlink precoding based at least in part on the restored downlink channel information.

Another aspect described herein relates to a wireless communications apparatus. The wireless communications apparatus can include a memory that retains instructions related to receiving modulated sounding reference signals, the received modulated sounding reference signals are received from each antenna among a plurality of antennas of a mobile device, receiving non-modulated sounding reference signals from each antenna among the plurality of antennas of the mobile device, restoring downlink channel information utilizing the modulated sounding reference signals and the non-modulate sounding reference signals and performing downlink precoding based at least in part on the restored downlink channel information. In addition, the wireless communications apparatus can include a processor, coupled to memory, configured to execute the instructions retained in the memory.

Yet another aspect relates to a wireless communications apparatus that facilitates downlink precoding based on sounding channel measurement in user equipment antenna configuration with unequal number of transmit and receive chains. The apparatus can comprise means for receiving modulated sounding reference signals, the received modulated sounding reference signals are received from each antenna among a plurality of antennas of a mobile device. The apparatus can also comprise means for receiving non-modulated sounding reference signals from each antenna among the plurality of antennas of the mobile device. In addition, the apparatus can include means for restoring downlink channel information utilizing the modulated sounding reference signals and the non-modulate sounding reference signals. Moreover, the apparatus can also include means for performing downlink precoding based at least in part on the restored downlink channel information.

Still another aspect relates to a computer program product, which can have a computer-readable medium include code for causing at least one computer to receive modulated sounding reference signals, the received modulated sounding reference signals are received from each antenna among a plurality of antennas of a mobile device. The computer-readable medium can also comprise code for causing at least one computer to receive non-modulated sounding reference signals from each antenna among the plurality of antennas of the mobile device. In addition, the computer-readable medium can include code for causing at least one computer to restore downlink channel information utilizing the modulated sounding reference signals and the non-modulate sounding reference signals. The computer-readable medium can further include code for causing at least one computer to perform downlink precoding based at least in part on the restored downlink channel information.

A further aspect described herein relates to relates to a wireless communications apparatus that can comprise a processor. The processor can be configured to receive modulated sounding reference signals, the received modulated sounding reference signals are received from each antenna among a plurality of antennas of a mobile device. The processor can also be configured to receive non-modulated sounding reference signals from each antenna among the plurality of antennas of the mobile device. In addition, the processor can be configured to restore downlink channel information utilizing the modulated sounding reference signals and the non-modulate sounding reference signals. The processor can further be configured to perform downlink precoding based at least in part on the restored downlink channel information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
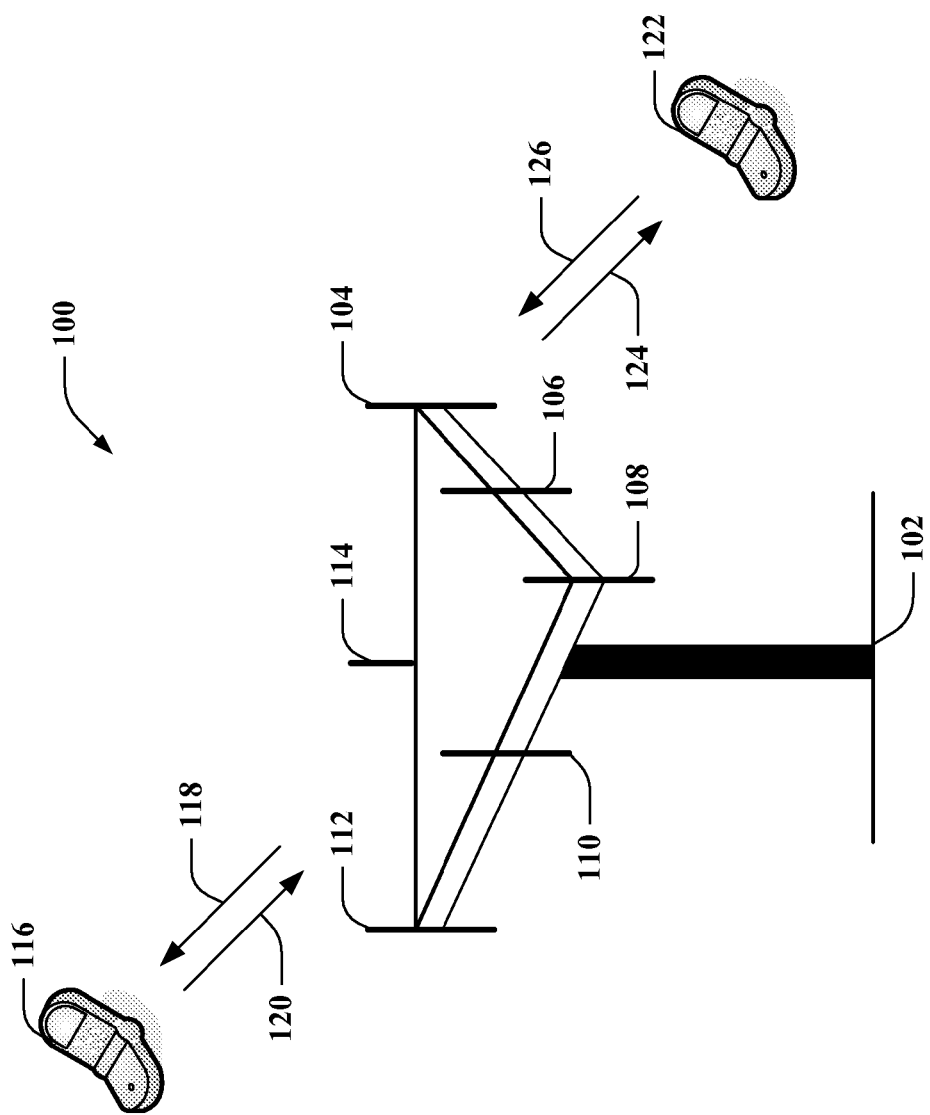
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring to FIG. 1, a wireless communication system 100 is illustrated in accordance with various embodiments presented herein. System 100 comprises a base station 102 (e.g., access point, NodeB, evolved NodeB, etc.) that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, certain mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In MIMO systems, base station 102 and mobile devices 116 and 122 can include a plurality of antennas in accordance with various practical configurations. For example, base station 102 can include full shared utilization of all antennas for transmission and reception. In addition, the set of transmit antennas can be a subset of the receive antennas or the set of receive antennas can be a subset of the transmit antennas. Mobile devices 116 and 122 can configure to have full shared utilization of all antennas or to establish a set of transmit antennas as a subset of receive antennas.

In TDD systems, forward link or downlink and reverse link or uplink transmissions are on a same spectrum. This enables downlink channels to be estimated through a calibrated version of the uplink and downlink channels. These transmissions can be explicit reference signals (e.g., known reference symbol sequences). According to another aspect, the transmissions can be transmission on uplink control channels that can be employed as reference symbols post demodulation. The sounding reference signal transmissions enable estimation of frequency-selective channels.

In TDD, channel reciprocity is typically only assured for physical propagation channels. Accordingly, noticeable differences between transfer characteristics of various analog portions (or samples thereof) utilized at TX/RX can lead to discrepancies in reciprocity of channels. In antenna array systems, each antenna can have transmitter and receiver chains that are different for all antennas. To account for these discrepancies, antenna array calibration can be performed. In particular, there are two types of mismatches addressed during calibration in antenna array systems. For instance, mismatches can be due to aspects of physical antenna structure such as, but not limited to, mutual coupling, tower effects, imperfect knowledge of element locations, amplitude and phase mismatches due to antenna cabling, and the like. Moreover, mismatches can be due to aspects of hardware components in each antenna TX/RX chain. For example, mismatches can be caused by analog filters, I and Q imbalance, phase and gain mismatch of low noise amplifier (LNA) or power amplifier (PA) on the chains, different non linearity effects, etc. Calibration can be performed so that a channel on one link (e.g., uplink or downlink) can be estimated based upon measurements of reference signals on the other link. Channel estimation enables precoding or other beamforming techniques to be employed.

In systems with multiple transmit and single receive antennas, beamforming provides increased single to interference plus noise ratios (SINR). In MIMO systems, eigen-beamforming can be utilized where multiple layers transmitted to a user can be signaled on eigen-beams of a channel. Achievable gains over non-beamformed transmissions are noticeable when number of layers transmitted rank less than number of transmit antennas at a base station. Moreover, gains are particularly noticeable in asymmetric antenna scenarios wherein number of base station transmit antennas is larger than number of mobile device receive antennas.

Pursuant to one aspect, beamforming can be accomplished according to the following. Uplink sounding reference signals for users in beamformed mode requires no feedback precoding information in symmetric scenarios. Accordingly, feedback errors are eliminated. In another aspect, mobile device specific reference symbols (e.g., precoded dedicated reference symbols) can be employed, embedded in each RB, utilized for demodulation and obviates a need to signal PMI in PDCCH.

Calibration can be performed to restore a downlink channel for downlink precoding. An uplink transfer function can be measured by number of sets of non-modulated uplink sounding channels. If uplink and downlink devices have flat transfer functions over a number of consecutive sounding tones per transmit antenna (e.g, the coherence bandwidth is greater than or equal to the number of sounding tones assigned to each transmit antenna), then a composite transfer function can be obtained from a sounding reference signal. The composite transfer functions for uplink and downlink channels can be represented as follows:

$$H_{DLC}(i,j,k) = G_{TX,eNB}(i,k) \cdot H_{DL}(i,j,k) \cdot G_{RX,UE}(j,k) = H_{DL}(i,j,k) \cdot G_{DL}(i,j,k)$$

$$H_{ULC}(i,j,k) = G_{TX,UE}(i,k) \cdot H_{UL}(i,j,k) \cdot G_{RX,eNB}(j,k) = H_{UL}(i,j,k) \cdot G_{UL}(i,j,k)$$

Pursuant to this example, $G_{TX,eNB}(i,k)$ represents base station transmit gain for antenna index I and tone k, $G_{RX,UE}(j,k)$ represents mobile device receive gain for antenna index j and tone k, $G_{TX,UE}(i,k)$ represents mobile device transmit gain for antenna index I and tone k and $G_{RX,eNB}(j,k)$ represent base station receive gain for antenna index j and tone k. In addition, $H_{DL}(i,j,k)$ represents a transfer function of the downlink for transmit antenna pair (i,j) at tone k, $H_{UL}(i,j,k)$ represents the uplink transfer function for antenna pair (i,j) at tone k, and $G_{DL}(i,j,k)$ and $G_{UL}(i,j,k)$ represent channel gains for downlink and uplink, respectively, for antenna pair (i,j) at tone k.

The aforementioned composite transfer functions convey information about the frequency selective channels. However, antennas gains are typically constant over bandwidth of interest. Conventionally, a receiver estimates a composite channel comprising transmit/receive antennas and true propagation channel. The calibration procedure is initiated by a base station and can be assisted by a mobile device. The mobile device can feed back estimated channel coefficients with a granularity of M tones, where M is an integer greater than or equal to 1. Typically, channel coefficients are constant over M contiguous tones for a given transmit/receive antenna pair.

Figure 2:
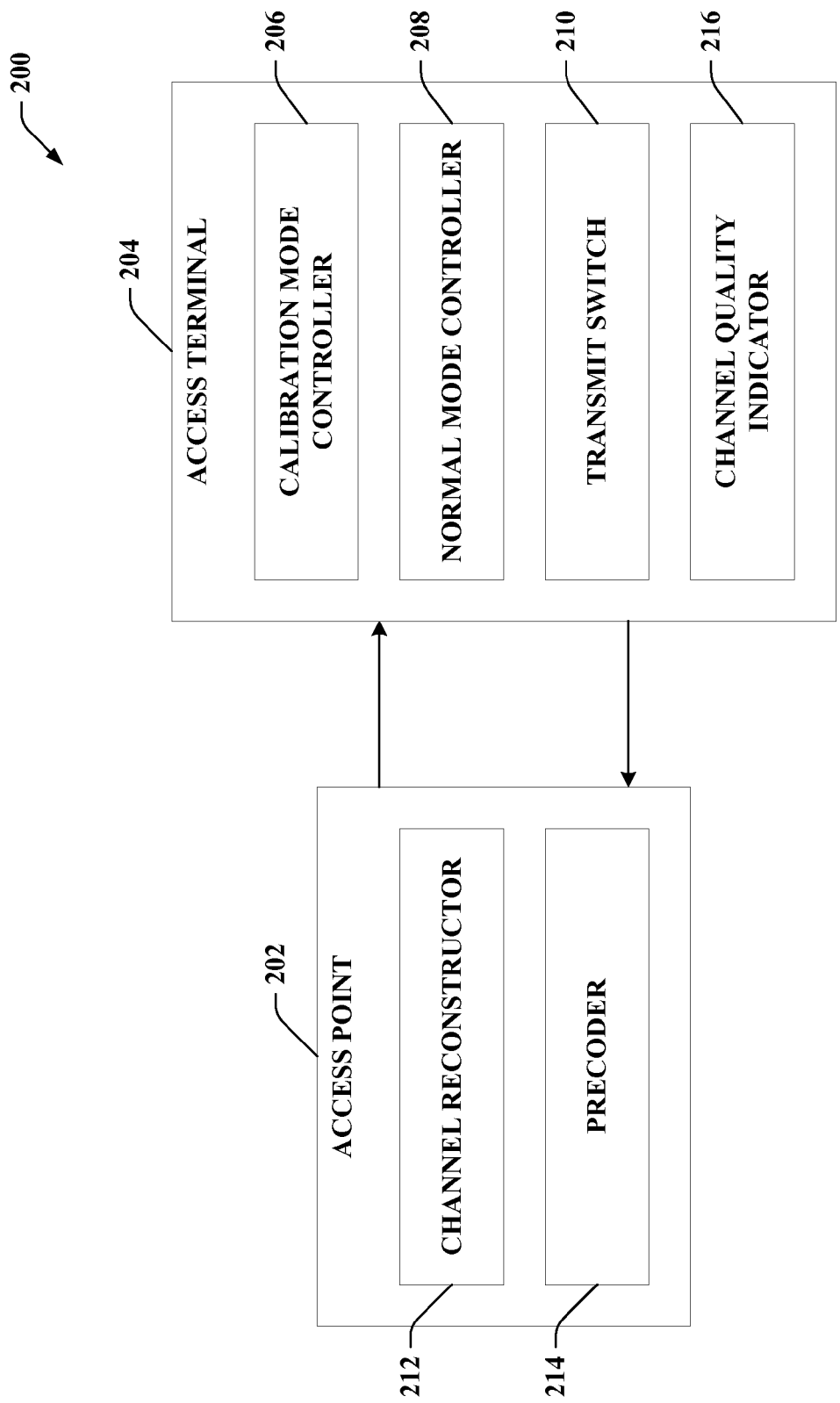
FIG. 2 is an illustration of an example wireless communications system that facilitates downlink precoding based on uplink sounding reference signal (SRS) measurement.

Turning to FIG. 2, illustrated is a wireless communications system 200 that facilitates downlink precoding based on uplink sounding reference signal (SRS) measurement. The system 300 includes an access point 202 (e.g., a base station, NodeB, evolved NodeB, etc.) that can communicate with an access terminal 204 (e.g., a mobile device, user equipment, etc.) and/or any number of disparate devices (not shown). The access point 202 can transmit information to the access terminal 204 over a forward link or downlink channel; further access point 202 can receive information from the access terminal 204 over a reverse link or uplink channel. Moreover, system 200 can be a MIMO system. Additionally, the system 200 can operate in an OFDMA wireless network (such as 3GPP, 3GPP2, 3GPP LTE, etc., for example). Also, the components and functionalities shown and described below in the access point 202 can be present in the access terminal 204 and vice versa, in one example.

Pursuant to an example, the access point 202 and access terminal 204 can operate in a time dimension duplex (TDD) system. The access terminal 204 can facilitate uplink sounding reference signal (SRS) and channel reciprocity based precoding. In situations with multiple antennas and transmit chains are a subset of receive chains, the communications apparatus 200 cannot provide full channel state information with reference signals to enable precoding. However, a transmit antenna switch can alternate SRS transmission through all antennas and provide full channel state information. In addition, a calibration procedure can be performed to account for different device transfer functions on the uplink and downlink. According to an aspect, the calibration procedure can involve modulating SRS transmission by an inversion of a relevant channel estimate.

For explanatory purposes, a TDD system with a 2×2 antenna configuration is described herein. For example, the access point 202 and the access terminal 204 can each have 2 antennas. It is to be appreciated that mechanisms described herein can be extended to other antenna configurations and the subject disclosure is not intended to be limited to a 2×2 configuration. The access point 204 can provide complete channel state information to the access terminal 202 even in situations where the access terminal 204 includes two receive (Rx) chains and only one transmit (Tx) chain (e.g., baseband-RF-PA chain).

Pursuant to an illustration, overall downlink and uplink transfer functions in a TDD system can be described as follows. The downlink channel transfer function from antenna j of the access point 202 to antenna i of the access terminal 204 can be represented as:

$$H_{DL,ij}(k) = D_{UE-Rx,i}(k) \cdot H_{Ch,ij}(k) \cdot D_{NB-Tx,j}(k) = D_{DL,ij}(k) \cdot H_{CH,ij}(k)$$

Pursuant to this example, $D_{UE-Rx,i}(k)$ represents an ith diagonal element of a 2×2 diagonal matrix corresponding to user equipment receive device characteristics for sub-carrier index k. Similarly, $D_{NB-Tx,j}(k)$ is the jth diagonal element of an M×M (e.g., M is an integer greater than or equal to one) diagonal matrix corresponding to base station transmit device characteristics for sub-carrier index k. $D_{DL,ij}(k)$ is an overall transfer function describing effects of a jth transmit antenna and an ith receive antenna for sub-carrier index k and $H_{Ch,ij}(k)$ is a channel propagation transfer function between the jth transmit antenna and the ith receive antenna for sub-carrier index k. The channel propagation transfer function is reciprocal between downlink and uplink in TDD.

The uplink channel transfer function from antenna i of the access terminal 204 to antenna j of the access point 202 can be represented as:

$$H_{UL,ji}(k) = D_{NB-Rx,j}(k) \cdot H_{Ch,ij}(k) \cdot D_{UE-Tx,i}(k) = D_{UL,ji}(k) \cdot H_{CH,ij}(k)$$

Pursuant to this illustration, $D_{UE-Tx,i}(k)$ represents an ith diagonal element of a 2×2 diagonal matrix corresponding to the user equipment transmit device characteristics for sub-carrier index k. Similarly, $D_{NB-RX,j}(k)$ is the jth diagonal element of an M×M (e.g., M is an integer greater than or equal to one) diagonal matrix corresponding to base station receive device characteristics for sub-carrier index k. $D_{UL,ji}(k)$ is an overall transfer function describing effects of a ith transmit antenna and an jth receive antenna for sub-carrier index k.

When the propagation channel transfer function is the same between uplink and downlink in TDD systems, the access terminal 204 can provide sufficient channel state information for downlink precoding when uplink SRS is transmitted through both antennas and a relevant calibration is performed. In an illustrative embodiment, the access terminal 204 can include a calibration mode controller 206 that facilitates transmitting modulated SRS, a normal mode controller 208 that facilitates transmitting non-modulated SRS, and a transmit switch 210 that selects an antenna for transmission among a plurality of antennas. The access point 202 includes a downlink channel reconstructor 212 that obtains the modulated SRS and the non-modulated SRS from the access terminal 304 and restores a downlink channel. The access point 202 further includes a precoder 214 that derives optimal precoding vectors from the downlink channel estimate to perform beamforming.

According to an example, the access terminal 204 operates in a calibration mode. The calibration mode controller 206 facilitates transmission of modulated SRS through all antennas of the access terminal 204. In the explanatory situation, the access terminal 204 includes two antennas, antenna 0 and antenna 1. The transmit switch 210 connects a power amplifier output signal to either antenna 0 or antenna 1. The calibration mode controller 206 modulates the SRS by an inverse of an estimated downlink transfer function. Thus, the access terminal 304 transmits $1/H_{DL,00}(2kL+o(0))$ and $1/H_{DL,01}((2k+1)L+o(0))$ on antenna 0 at time 0 and transmits $1/H_{DL,10}(2kL+o(1))$ and $1/H_{DL,11}((2k+1)L+o(1))$ on antenna 1 at time 1. Pursuant to this illustration, an SRS is transmitted every L tones and o(0) and o(1) denotes potential tone index offsets associated with sounding channels of antenna 0 and antenna 1, respectively. The access point 202 receives $H_{UL,00}(2kL+o(0))/H_{DL,00}(2kL+o(0))$ and $H_{UL,10}((k+1)2L+o(1))/H_{DL,01}((2k+1)L+o(1))$ through antenna 0 and antenna 1, respectively, of access point 202 at time 0. In addition, the access point 202 receives $H_{UL,01}(2kL+o(0))/H_{DL,10}$ $(2kL+o(0))$ and $H_{UL,11}((2k+1)L+o(1))/H_{DL,11}((2k+1)L+o(1))$ through antenna 0 and 1, respectively, at time 1.

Due to reciprocity of the physical propagation channels, observation of uplink transfer functions are equivalent to observations of ratios between uplink device transfer functions and downlink device transfer functions. Accordingly, the modulated SRS received can be reduced to:

$$D_{UL,00}(2kL+o(0))/D_{DL,00}(2kL+o(0))$$

$$D_{UL,10}((2k+1)L+o(1))/D_{DL,01}((2k+1)L+o(1))$$

$$D_{UL,01}(2kL+o(0))/D_{DL,10}(2kL+o(0))$$

$$D_{UL,11}((2k+1)L+o(1))/D_{DL,11}((2k+1)L+o(1))$$

Further, in situations where coherence bandwidth of the device transfer function is larger than $2Lf_o$ for sub-carrier spacing of $f_o$, the modulated SRS can be written as:

$$D_{UL,ji}(2kL)/D_{DL,ij}(2kL)=D_{UL,ji}((2k+1)L)/D_{DL,ij}((2k+1)L)=D_{UL,ji}(n)/D_{DL,ij}(n)$$

i=0,1
j=0,1 for at least 2L consecutive tone indices $n=2kL, 2kL+1, \ldots, 2(k+1)L-1$. According to another aspect, an average over multiple SRS tones can be determined to produce a better estimate of the ratios if coherence bandwidth is much larger than $2Lf_o$.

In accordance with another aspect, a pure time division multiplexed (TDM) as opposed to the frequency division multiplexed (FDM) and TDM approached described supra. In the FDM-TDM approach, all inverted downlink transfer functions associated with a certain user equipment antenna is sent back at the same time by utilizing different SRS tones. In a pure TDM approach, only one inverted downlink transfer function associated with only a single base station antenna and a single user equipment antenna is sent back at a time. More specifically, the transmit switch 210 alternately connects PA output signal to antennas 0 and 1 to send estimates one at time. For example, antenna 0 of access terminal 204 can be utilized to deliver $1/H_{DL,00}(kL)$ on the kL-th tone at time 0. Antenna 1 delivers the estimate $1/H_{DL,10}(kL)$ on the kL-th tone at time 1. At time 2, antenna 0 delivers $1/H_{DL,01}(kL)$ on the kL-th tone. At time 3, antenna 1 delivers $1/H_{DL,11}(kL)$ on the kL-th tone. The downlink channel reconstructor 212 can restore the ratios, for i=0, 1 and j=0, 1 over four time intervals.

It is to be appreciated that the modulate symbol of the SRS is not limited to a direct inversion of a downlink channel estimate. Other modulation symbols can provide better calibration information to maximize downlink precoding gain. For example, the modulation symbol could be a MMSE-type inversion of DL channel:

$$\frac{H_{DL,ij}^*}{|H_{DL,ij}|^2+N_o}$$

Where $N_o$ is a positive value (e.g., an interference level estimate) and A* is the complex conjugate of A. The modulation symbol could also be a phase of a complex conjugate of the downlink channel $\angle H_{DL,ij}^*$, or the complex conjugate itself, $H_{DL,ij}^*$.

After transmission of modulated SRS in the calibration mode, the access point 202 obtains four sets of calibration factors (e.g., ratios of uplink device transfer functions to downlink device transfer functions). The access terminal 304 transitions into a normal mode controlled by the normal mode controller 308. The normal mode controller 208 facilitates transmission of non-modulated SRS through all antennas of the access terminal 204. The transmit switch 210 connects a power amplifier output signal to either antenna 0 or antenna 1 so that non-modulated SRS can transmit on both antennas. The downlink channel reconstructor 212 computes an overall downlink channel estimate $H_{DL,ij}$ based upon the non-modulated SRS and the calibration factor. For example, the downlink channel reconstructor 212 can divide an uplink channel measurement result $H_{UL,ji}$ obtained from the non-modulated SRS by the calibration factors $D_{UL,ji}/D_{DL,ij}$ to restore the estimate. More specifically, the channel is restored corresponding to SRS tones according to the following:

$$H_{DL,ij}(kL)=H_{UL,ji}(kL)/(D_{UL,ji}(2L\lceil k/2\rceil)/D_{DL,ij}(2L\lceil k/2\rceil))-1$$

wherein other tones can be restored by interpolation.

After restoration of downlink channel estimates, the precoder 214 can derive optimal precoding vectors and perform beamforming. For example, the precoder 214 can employ singular value decompression. In some situation, the access point 202 requires downlink noise level information (e.g., noise covariance matrix, downlink SNR, etc.) to determine optimal rank selection and potentially different power allocation for each layer. Accordingly, the access terminal 204 includes a channel quality indicator 216 that reports downlink noise information to the access point 202 to maximize precoding gain. For instance, the can employ an uplink control channel such as a channel quality indicator (CQI) channel.

Moreover, although not shown, it is to be appreciated that access point 202 and access terminal 204 can include memory that retains instructions with respect to receiving and transmitting modulated sounding reference signals, receiving and transmitting non-modulated sounding reference signals from each antenna among the plurality of antennas of the mobile device, restoring downlink channel information and performing downlink precoding. Further, the access point 202 and access terminal 204 can include a processor that may be utilized in connection with executing instructions (e.g., instructions retained within memory, instructions obtained from a disparate source, . . . ).

Figure 3:
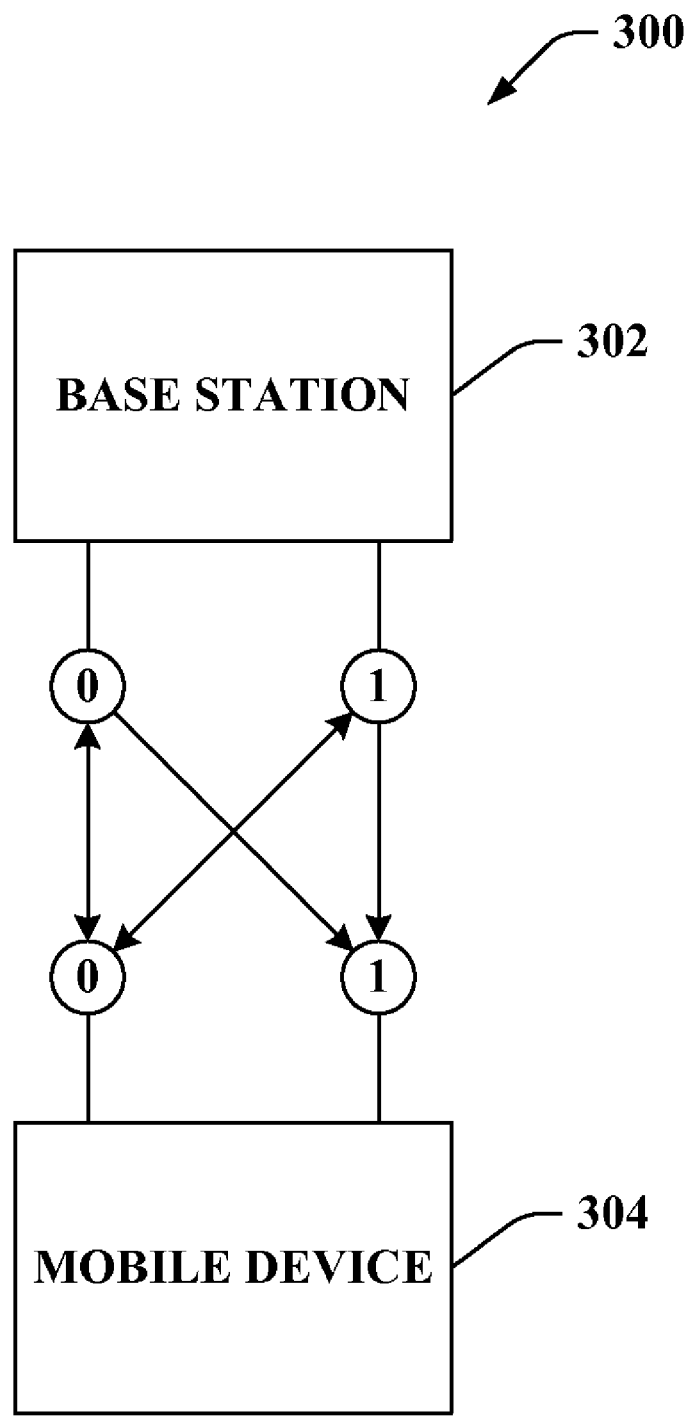
FIG. 3 is an illustration of an example system that depicts a mobile device with an unequal number of receive (Rx) chains and transmit (Tx) chains.

Turning now to FIG. 3, illustrated is an exemplary system 300 that depicts a mobile device with an unequal number of receive (Rx) chains and transmit (Tx) chains. The system includes a base station 302 and a mobile device 304. While the base station 302 and the mobile device 304 are depicted having two antennas each (e.g., a 2×2 antenna configuration), it is be appreciated that the base station 302 and mobile device 304 can include any number of antennas. For example, system 300 can be an M×N system where M and N are any integers greater than or equal to one. In one aspect, the mobile device 304 includes two Rx chains and only one Tx chain. Accordingly, only one antenna (e.g., antenna 0) is utilized to transmit uplink data to the base station 302 while both antennas (e.g., antenna 0 and antenna 1) are employed to receive downlink data from the base station 302. In this configuration, the base station 302 cannot acquire sufficient downlink channel information to perform precoding based on SRS measurement and reciprocity.

Figure 4:
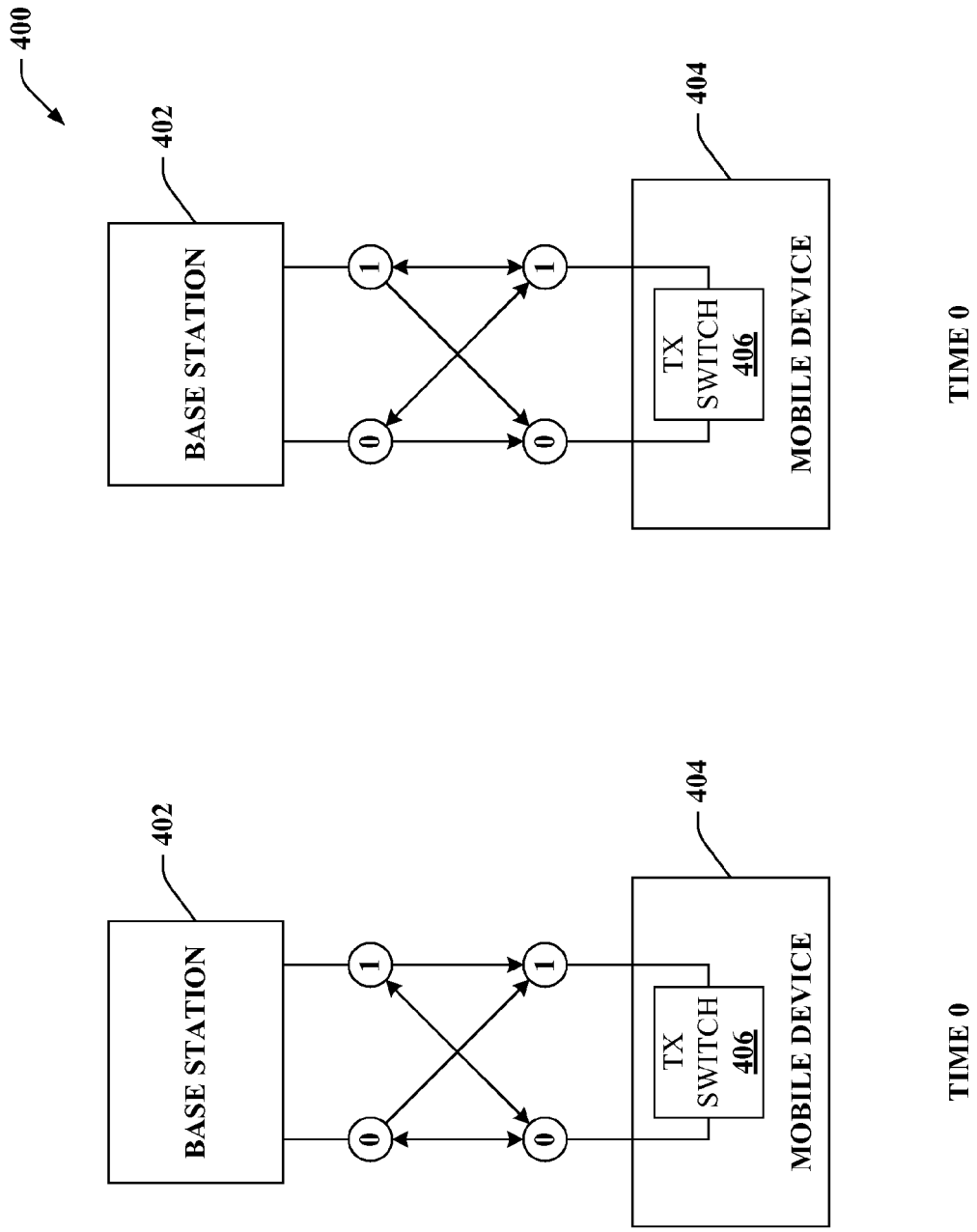
FIG. 4 is an illustration of example system that employs uplink transmit switching.

Referring now to FIG. 4, illustrated is a system 400 that employs uplink transmit switching. System 400 includes a base station 302 having two antennas and a mobile device 304 also having two antennas. In addition, the mobile device 304 includes two Rx chains and one Tx chain. Accordingly, one antenna is employed to transmit data to the base station 302 and both antennas are utilized to receive data from the base station 302. The mobile device 404 further includes a Tx switch 406 that alternatively connects a power amplifier output signal to one of the of two antennas. In other words, the Tx switch 406 facilitates switching the antenna employed by the mobile device 404 to transmit data. For instance, at time 0, antenna 0 of mobile device 404 is employed to transmit data to the base station 402. At time 1, the Tx switch 406 switches so that antenna 1 of mobile device 404 is employed to transmit data.

Uplink antenna switching enables uplink transmit diversity when a mobile device is equipped with at least two antennas and a set of transmit chains that is a subset of a set of receive chains. A transmit switch (e.g., Tx switch 406), which connects power amplifier output signal to one of the antennas of a mobile device, facilitates realizing time switch transmit diversity (TSTD) and/or selection transmit diversity (STD). TSTD delivers uplink demodulation reference, control or data signals alternately through the antennas, while STD delivers such data through a best antenna selected by a base station. To facilitate selection, uplink sounding reference signal is transmitted through all antennas. Since sounding reference signal is transmitted through all antennas, uplink antenna switching enables downlink precoding in TDD systems even when number of mobile device transmit chains is smaller than number of receive chains.

Figure 5:
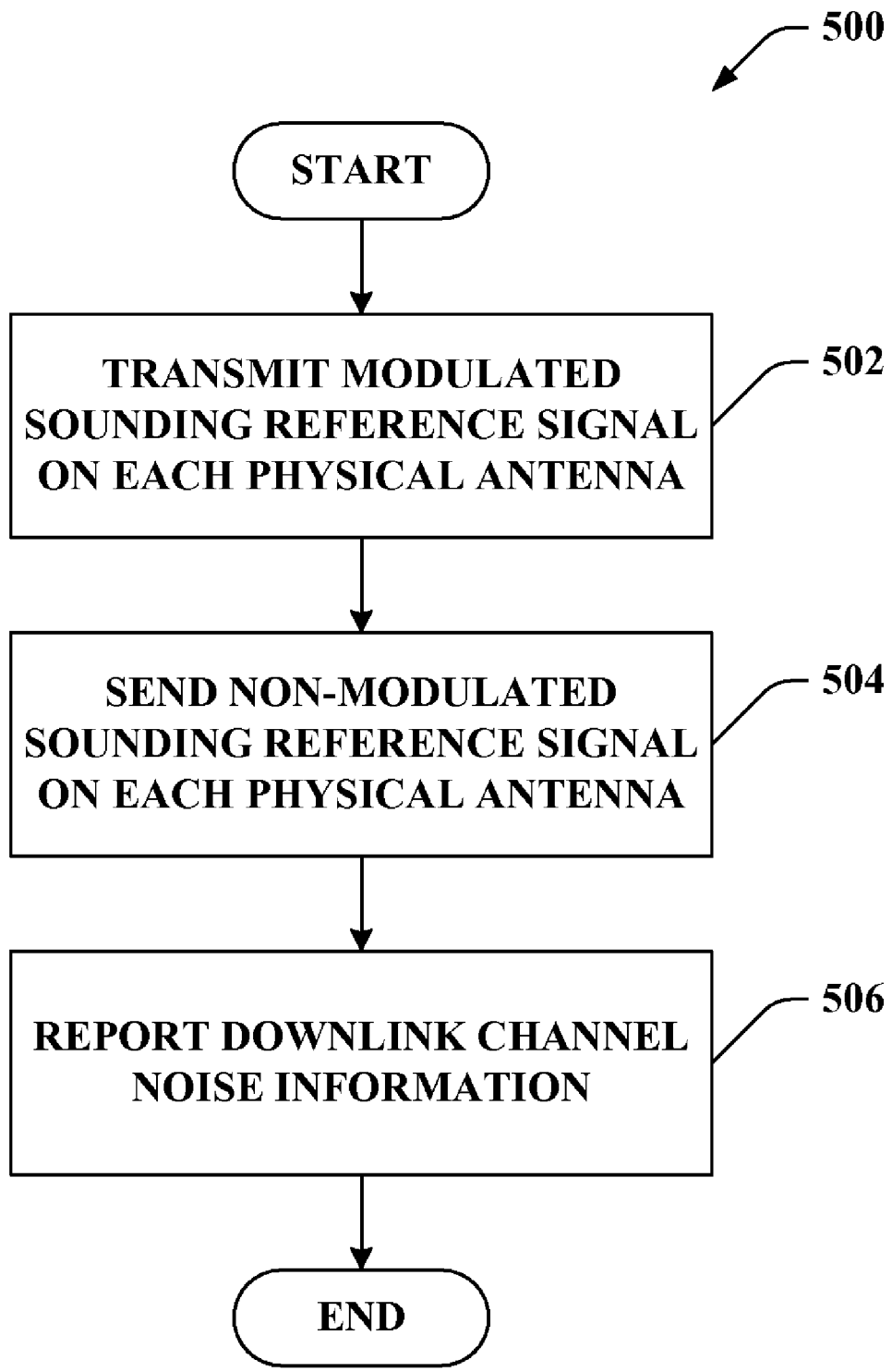
FIG. 5 is an illustration of an example methodology that facilitates downlink precoding based on sounding reference signal measurement in a wireless communications system.
Figure 6:
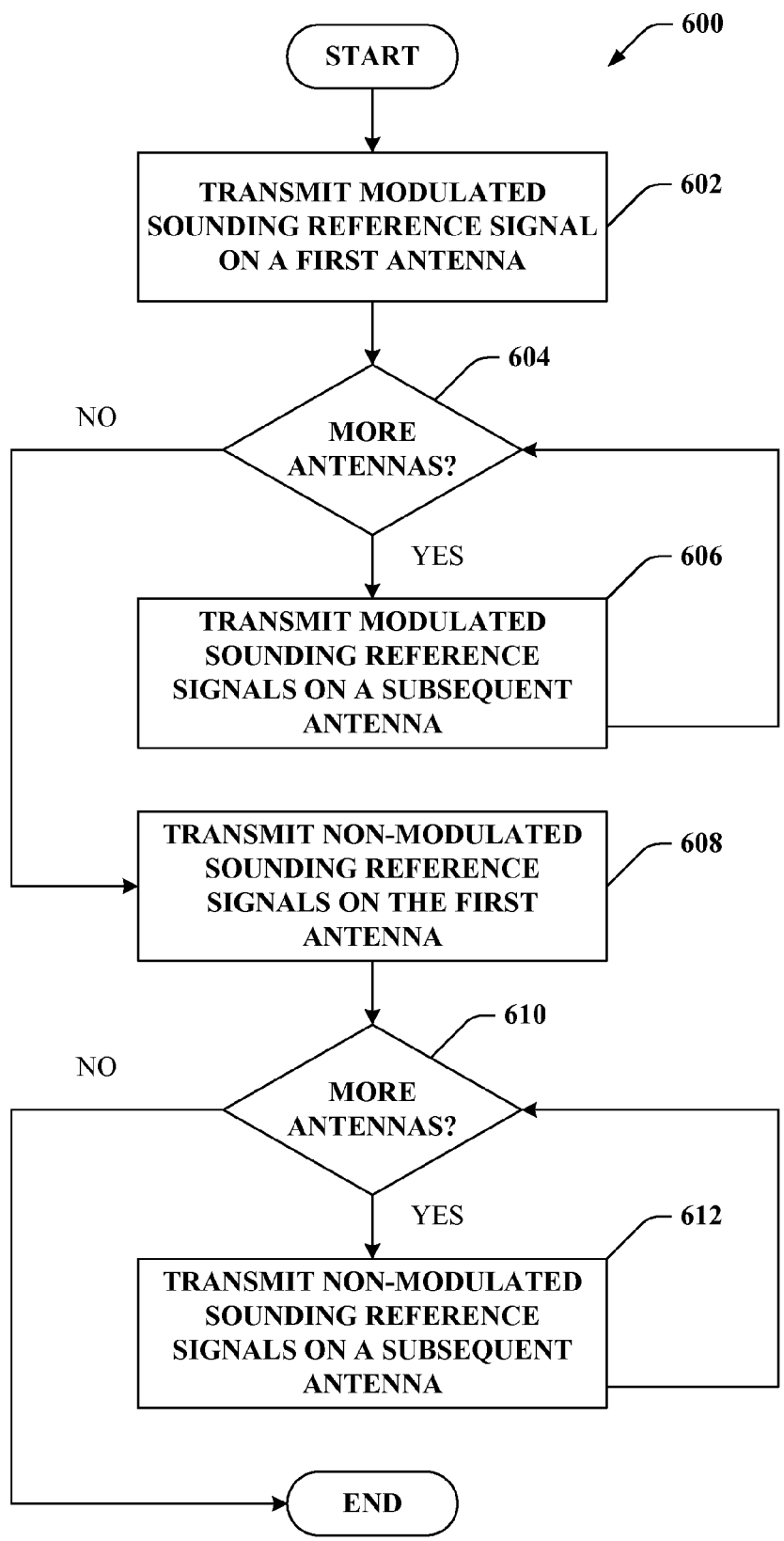
FIG. 6 is an illustration of an example methodology that utilizes uplink transmit switching to facilitate providing complete downlink channel information.
Figure 7:
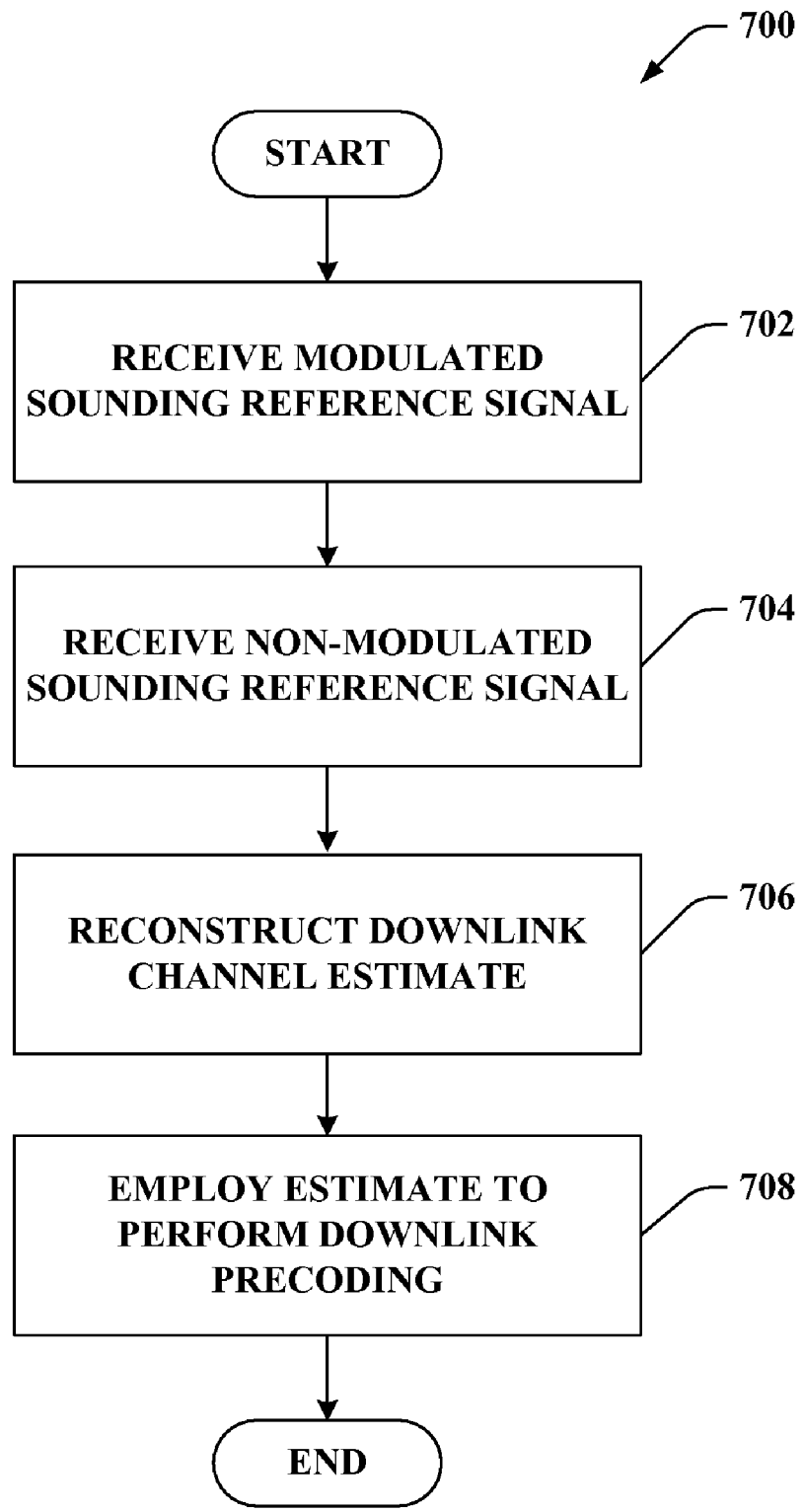
FIG. 7 is an illustration of an example methodology that facilitates employing sounding reference signal (SRS) measurements on an uplink to perform precoding in time division duplex (TDD) systems.

Referring to FIGS. 5-7, methodologies relating to employing downlink precoding in a wireless communications system based upon uplink sounding reference signal measurement and channel reciprocity. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates downlink precoding based on sounding reference signal measurement in a wireless communications system. At reference numeral 502, modulated uplink sounding reference signal (SRS) are transmitted on each physical antenna. For example, a mobile device can include a plurality of antennas but a number of transmit chains less than a number of antennas utilized for receiving. Accordingly, SRS transmissions are sent on each antenna to produce complete downlink channel information. According to an aspect, the SRS is modulated with an inverse of a downlink channel estimate. While channel reciprocity exists for physical propagation channels in time division duplex systems, differences in device transfer functions can create inaccuracies. Accordingly, the modulated SRS can be employed as calibration factors. At reference numeral 504, non-modulated SRS is transmitted on each physical antenna. Pursuant to an illustration, the sounding reference signal can be a known sequence, a sequence of ones, etc. The non-modulated SRS can be utilized with a calibration factor (e.g., modulated SRS) to generate a complete downlink channel estimate. At reference numeral 506, downlink channel noise information can be reported to further maximize precoding gains.

FIG. 6 illustrates a methodology 600 that utilizes uplink transmit switching to facilitate providing complete downlink channel information. At reference numeral 602, a modulated sounding reference signal (SRS) is transmitted on a first antenna. The SRS can be a known sequence, a sequence of ones, or the like. At reference numeral 604, a determination is made as to whether there are more antennas to be utilized in transmitting modulated SRS. If more antennas are available, the method 600 proceeds to reference numeral 606 where modulated SRS is transmitted on a subsequent antenna. Method 600 returns to 604 to determine if any antennas remain. Steps 604 and 606 repeat until modulated SRS have been transmitted on all antennas. The method 600 proceeds to 608 after all antennas have been employed for modulated SRS. At reference numeral 608, non-modulate SRS is transmitted on the first antenna. At reference numeral 610, a determination is made if additional antennas are available that have not been utilized to transmit non-modulated SRS. If Yes, the method 600 proceeds to reference numeral 612 where non-modulated SRS is transmitted on a subsequent antenna. Similar to the transmission of modulated SRS, steps 610 and 612 repeat until all antennas have been employed to transmit non-modulated SRS.

Turning to FIG. 7, illustrated is a methodology 700 that facilitates employing sounding reference signal (SRS) measurements on an uplink to perform precoding in time division duplex (TDD) systems. At reference numeral 702, modulated SRS is received. In accordance with an aspect, modulated SRS transmissions are received from each antenna of a mobile device. The modulated SRS is modulated with an inverted downlink channel estimate and can be utilized to calibrate the access point or base station. At reference numeral 704, the non-modulated SRS is received. Similar to the modulate SRS transmission, the non-modulated SRS transmissions are received from each antenna of the mobile device. At reference numeral 706, a downlink channel estimate is reconstructed. For example, the modulated SRS and non-modulated SRS can be utilized to restore the downlink channel. At reference numeral 708, the restored downlink channel estimate is employed to perform downlink precoding.

It will be appreciated that, in accordance with one or more aspects described herein, inferences can be made regarding estimating downlink channels, selecting precoding vectors and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
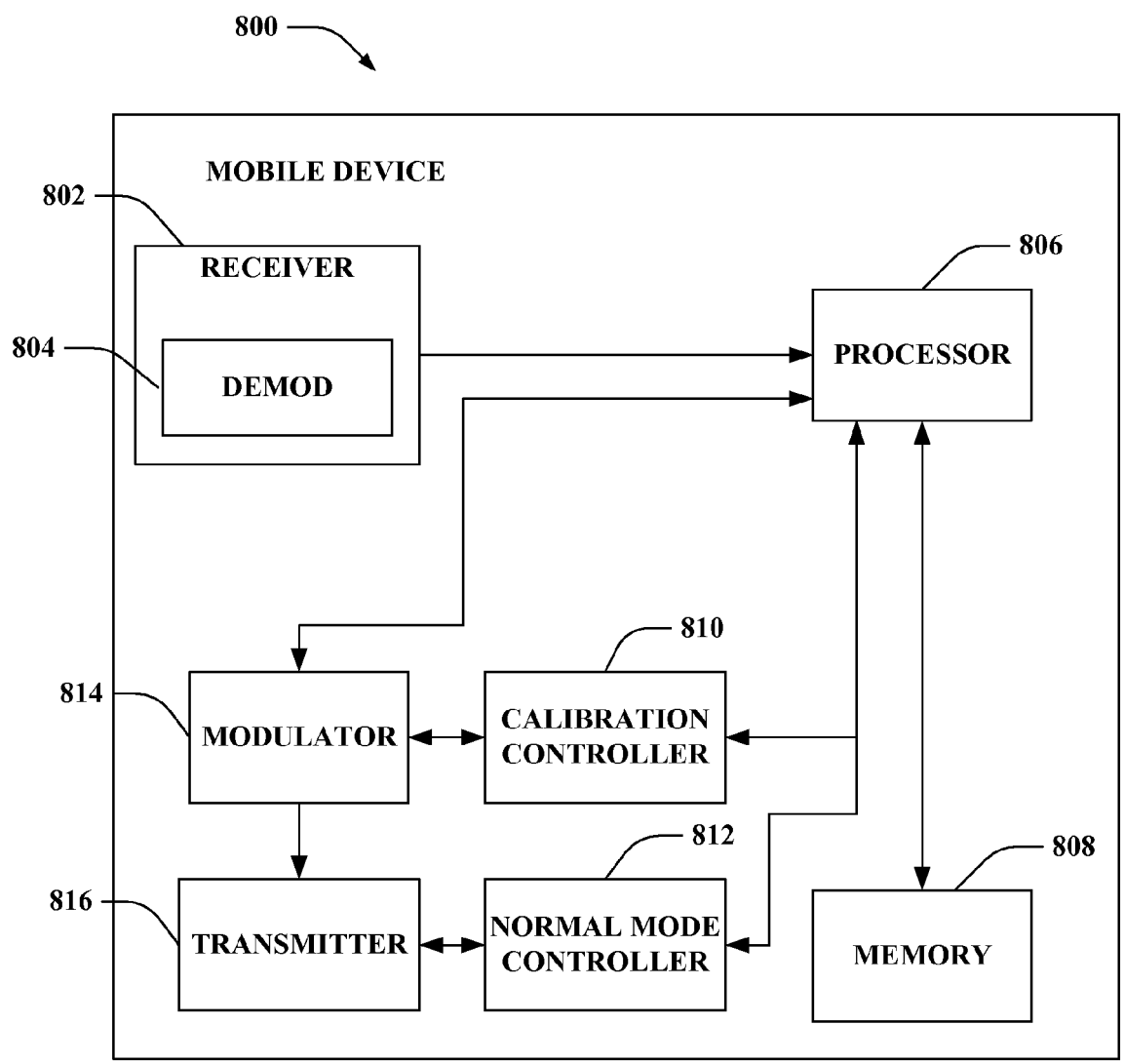
FIG. 8 is an illustration of an example system that facilitates downlink precoding based upon uplink sounding reference signal measurement and channel reciprocity in TDD systems.

FIG. 8 is an illustration of a mobile device 800 that facilitates downlink precoding based upon uplink sounding reference signal measurement and channel reciprocity in TDD systems. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.). Further, memory 808 can retain prioritized bit rates, maximum bit rates, queue sizes, etc., related to one or more bearers serviced by the mobile device 800.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to a calibration controller 810 that facilitates transmission of sounding reference signals to a base station. The sounding reference signals can be modulated to provide calibration factors that account for differences in device transfer functions. The calibration controller 810 can utilized a modulator 814 to modulate the sounding reference signal. In one example, the modulation symbol can be an inverse of a downlink channel estimate. Processor 806 can further be coupled to a normal mode controller 812 that facilitates transmission of non-modulated sounding reference signals. The non-modulated sounding reference signal can be utilized with the modulated sounding reference signal to generate a reconstructed downlink channel estimate. Mobile device 800 still further comprises the modulator 814 and transmitter 816 that respectively modulate and transmit signals to, for instance, a base station, another mobile device, etc. Although depicted as being separate from the processor 806, it is to be appreciated that the calibration controller 810, normal mode controller 812, demodulator 804, and/or modulator 814 can be part of the processor 806 or multiple processors (not shown).

Figure 9:
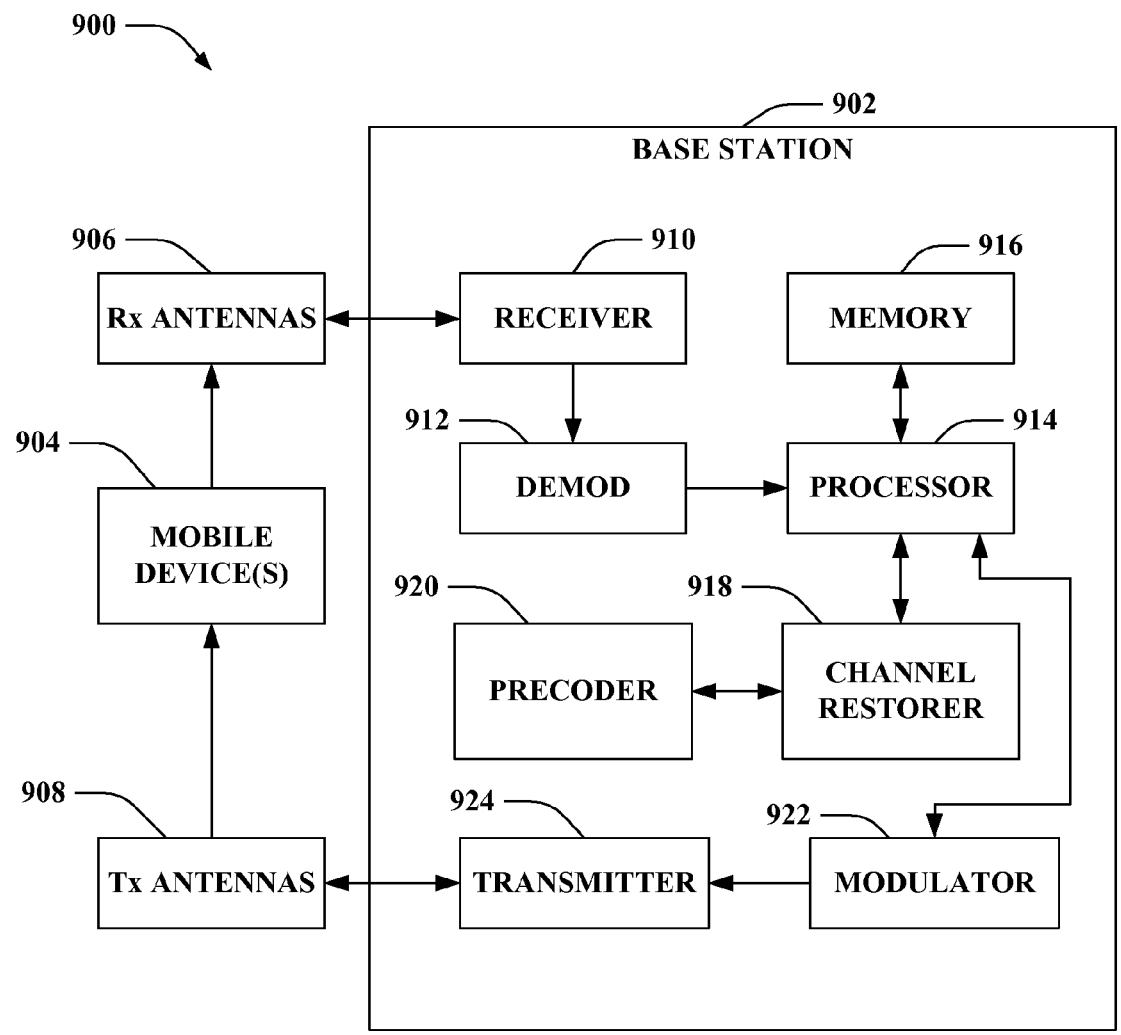
FIG. 9 is an illustration of an example system that facilitates measuring uplink sounding reference signals to perform downlink precoding based upon channel reciprocity in TDD systems.

FIG. 9 is an illustration of a system 900 that facilitates measuring uplink sounding reference signals to perform downlink precoding based upon channel reciprocity in TDD systems. The system 900 comprises a base station 902 (e.g., access point, . . . ) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 can be a processor dedicated to analyzing information received by receiver 910 and/or generating information for transmission by a transmitter 924, a processor that controls one or more components of base station 902, and/or a processor that both analyzes information received by receiver 910, generates information for transmission by transmitter 924, and controls one or more components of base station 902.

Base station 902 can additionally comprise memory 916 that is operatively coupled to processor 914 and that can store data to be transmitted, received data, information related to available channels, data associated with analyzed signal and/or interference strength, information related to an assigned channel, power, rate, or the like, and any other suitable information for estimating a channel and communicating via the channel. Memory 916 can additionally store protocols and/or algorithms associated with estimating and/or utilizing a channel (e.g. performance based, capacity based, etc.).

It will be appreciated that the memory 916 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 914 is further coupled to a channel restorer 918. The channel restorer obtains modulated SRS and non-modulated SRS from mobile device 904 and reconstructs the downlink channel. The channel restorer 918 can be coupled to a precoder 920 that employs the reconstructed downlink channel to perform downlink precoding. Furthermore, although depicted as being separate from the processor 914, it is to be appreciated that the channel restorer 918, precoder 920, demodulator 912, and/or modulator 922 can be part of the processor 914 or multiple processors (not shown).

Figure 10:
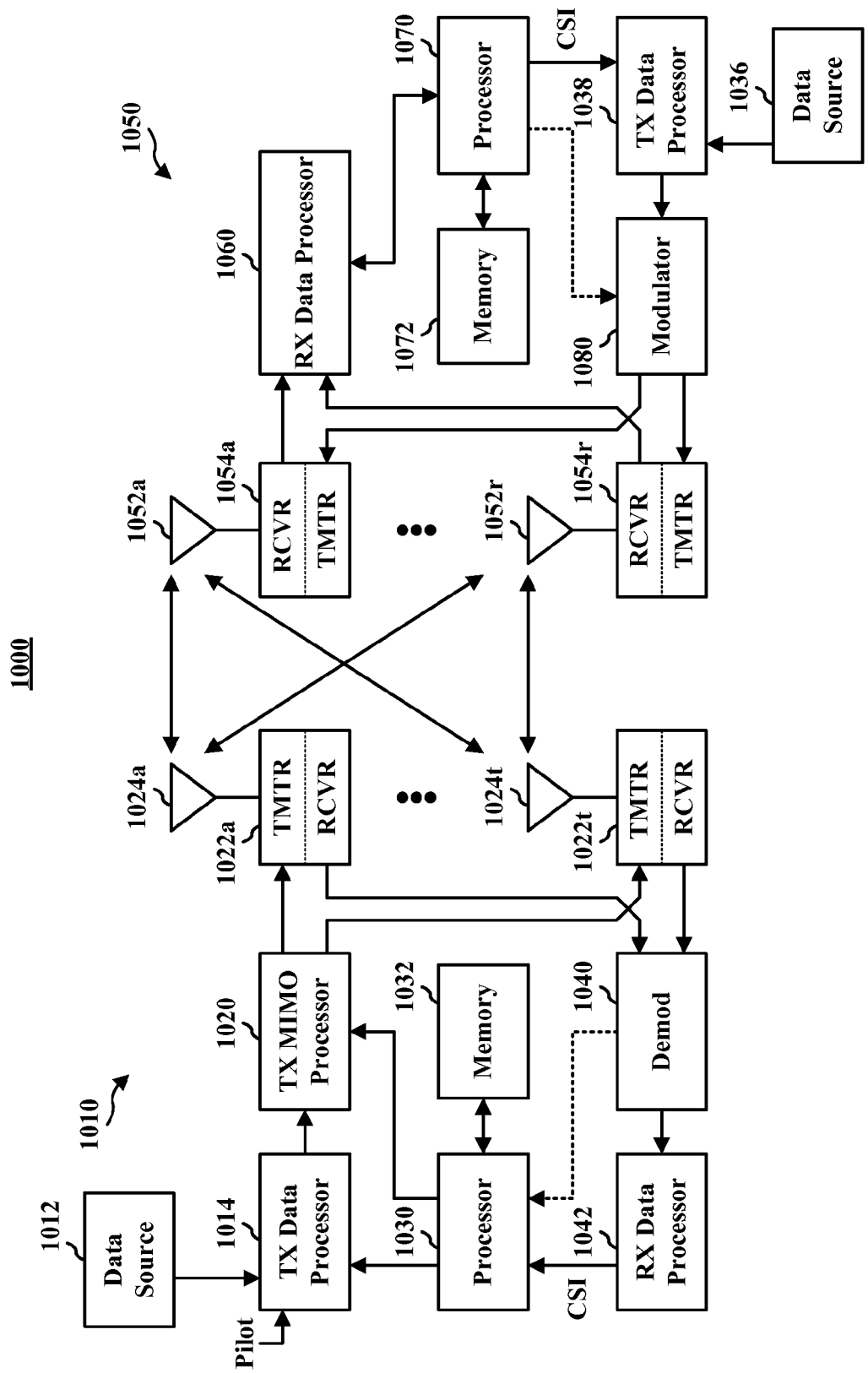
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
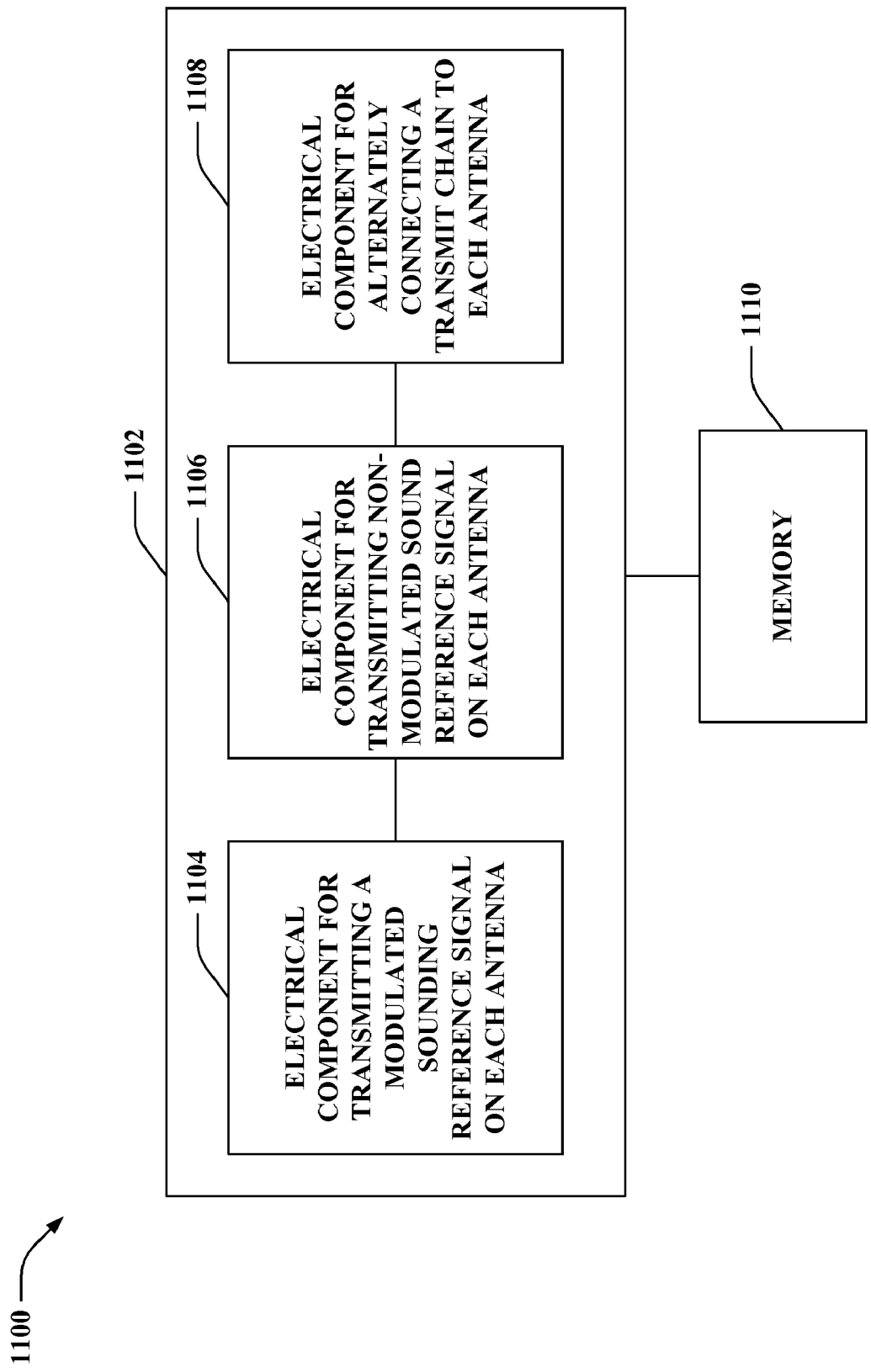
FIG. 11 is an illustration of an example system that facilitates downlink precoding based on uplink sounding channel measurements.

With reference to FIG. 11, illustrated is a system 1100 that facilitates downlink precoding based on uplink sounding channel measurements. For example, system 1100 can reside at least partially within a mobile device. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for transmitting a modulated sounding reference signal on each antenna in a plurality of antennas 1104. Pursuant to an example, the modulated sounding reference signal can compensate for discrepancies in device transfer functions between downlink and uplink. Further, logical grouping 1102 can comprise an electrical component for transmitting non-modulated sounding reference signal on each antenna in the plurality of antennas 1106. Moreover, logical grouping 1102 can comprise an electrical component for alternately connecting a transmit chain to each antenna in the plurality of antennas to facilitate transmission of sounding reference signals on all antennas 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
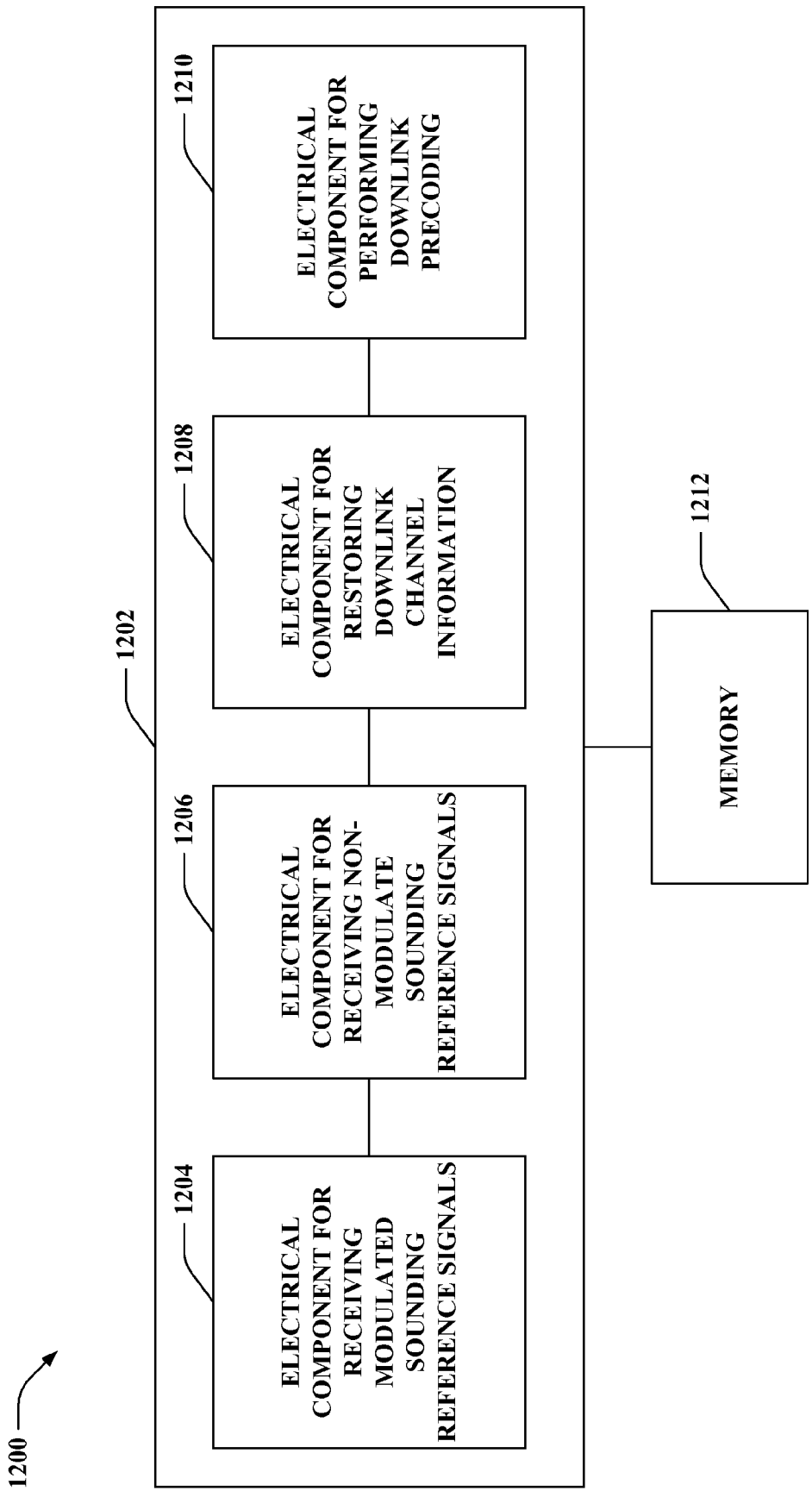
FIG. 12 is an illustration of an example system that facilitates employing sounding channel measures to perform downlink precoding.

With reference to FIG. 12, illustrated is a system 1200 that facilitates employing sounding channel measures to perform downlink precoding. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving modulated sounding reference signals 1204. Pursuant to an illustration, the modulated sounding reference signals are received from each antenna among a plurality of antennas of a mobile device. Further, logical grouping 1202 can comprise an electrical component for receiving non-modulated sounding reference signals from each antenna among the plurality of antennas of the mobile device 1206. Moreover, logical grouping 1202 can comprise an electrical component restoring downlink channel information utilizing the modulated sounding reference signals and the non-modulate sounding reference signals 1208. In addition, logical grouping 1202 can include an electrical component for performing downlink precoding based at least in part on the restored downlink channel information 1210. Additionally, system 1200 can include a memory 1212 that retains instructions for executing functions associated with electrical components 1204, 1206, 1208 and 1210. While shown as being external to memory 1212, it is to be understood that one or more of electrical components 1204, 1206, 1208 and 1210 can exist within memory 1212.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates downlink precoding for user equipment antenna configurations with unequal number of transmit and receive chains, comprising:
    transmitting a modulated sounding reference signal on each antenna in a plurality of antennas of a user equipment, the modulated sounding reference signal compensates for discrepancies in device transfer functions between downlink and uplink;
    transmitting a non-modulated sounding reference signal on each antenna in the plurality of antennas of the user equipment; and
    alternately connecting a transmit chain to each antenna in the plurality of antennas to facilitate transmission of sounding reference signals on the plurality of antennas of the user equipment.

2. The method of claim 1, further comprising reporting downlink channel quality information on a channel quality indicator channel.

3. The method of claim 1, further comprising employing a modulation symbol based at least in part on a downlink channel estimate to generate the modulated sounding reference signal.

4. The method of claim 3, wherein the modulation symbol is at least one of an inversion of a downlink channel estimate, a multimedia message system environment type inversion of the downlink channel estimate, a phase of a complex conjugate of a downlink channel or the complex conjugate itself.

5. The method of claim 1, wherein the modulated and non-modulated sounding reference signals are sequences of ones.

6. The method of claim 1, wherein the modulated and non-modulated sounding reference signals are known sequences of bits.

7. A wireless communications apparatus, comprising:
    a memory that retains instructions related to transmitting a modulated sounding reference signal on each antenna in a plurality of antennas of a user equipment, the modulated sounding reference signal compensates for discrepancies in device transfer functions between downlink and uplink, transmitting a non-modulated sounding reference signal on each antenna in the plurality of antennas of the user equipment, and alternately connecting a transmit chain to each antenna in the plurality of antennas to facilitate transmission of sounding reference signals on the plurality of antennas of the user equipment; and
    a processor, coupled to the memory, configured to execute the instructions retained in the memory.

8. The wireless communications apparatus of claim 7, the memory further retains instructions for reporting downlink channel quality information on a channel quality indicator channel.

9. The wireless communications apparatus of claim 7, the memory further retains instructions for employing a modulation symbol based at least in part on a downlink channel estimate to generate the modulated sounding reference signal.

10. The wireless communications apparatus of claim 9, wherein the modulation symbol is at least one of an inversion of a downlink channel estimate, a multimedia message system environment type inversion of the downlink channel estimate, a phase of a complex conjugate of a downlink channel or the complex conjugate itself.

11. A wireless communications apparatus that facilitates downlink precoding for user equipment antenna configurations with unequal number of transmit and receive chains, comprising:
    means for transmitting a modulated sounding reference signal on each antenna in a plurality of antennas of a user equipment, the modulated sounding reference signal compensates for discrepancies in device transfer functions between downlink and uplink;
    means for transmitting a non-modulated sounding reference signal on each antenna in the plurality of antennas of the user equipment; and means for alternately connecting a transmit chain to each antenna in the plurality of antennas to facilitate transmission of sounding reference signals on the plurality of antennas of the user equipment.

12. The wireless communications apparatus of claim 11, further comprising means for reporting downlink channel quality information on a channel quality indicator channel.

13. The wireless communications apparatus of claim 11, further comprising means for employing a modulation symbol based at least in part on a downlink channel estimate to generate the modulated sounding reference signal.

14. The wireless communications apparatus of claim 13, wherein the modulation symbol is at least one of an inversion of a downlink channel estimate, a multimedia message system environment type inversion of the downlink channel estimate, a phase of a complex conjugate of a downlink channel or the complex conjugate itself.

15. The wireless communications apparatus of claim 11, wherein the modulated and non-modulated sounding reference signals are sequences of ones.

16. The wireless communications apparatus of claim 11, wherein the modulated and non-modulated sounding reference signals are known sequences of bits.

17. A computer program product, comprising:
a computer-readable medium comprising:
code for causing at least one computer to transmit a modulated sounding reference signal on each antenna in a plurality of antennas of a user equipment, the modulated sounding reference signal compensates for discrepancies in device transfer functions between downlink and uplink;
code for causing at least one computer to transmit a non-modulated sounding reference signal on each antenna in the plurality of antennas of the user equipment; and
code for causing at least one computer to alternately connect a transmit chain to each antenna in the plurality of antennas to facilitate transmission of sounding reference signals on the plurality of antennas of the user equipment.

18. The computer program product of claim 17, the computer-readable medium further comprises code for causing at least one computer to employ a modulation symbol based at least in part on a downlink channel estimate to generate the modulated sounding reference signal.

19. The computer program product of claim 18, wherein the modulation symbol is at least one of an inversion of a downlink channel estimate, a multimedia message system environment type inversion of the downlink channel estimate, a phase of a complex conjugate of a downlink channel or the complex conjugate itself.

20. In a wireless communications system, an apparatus comprising:
a processor configured to:
transmit a modulated sounding reference signal on each antenna in a plurality of antennas of a user equipment, the modulated sounding reference signal compensates for discrepancies in device transfer functions between downlink and uplink;
transmit a non-modulated sounding reference signal on each antenna in the plurality of antennas of the user equipment; and
alternately connect a transmit chain to each antenna in the plurality of antennas to facilitate transmission of sounding reference signals on the plurality of antennas of the user equipment.

21. A method for downlink precoding based on sounding channel measurement, comprising:
receiving modulated sounding reference signals, the received modulated sounding reference signals are received from each antenna among a plurality of antennas of a mobile device, the modulated sounding reference signals including calibration factors that compensate for discrepancies in device transfer functions between downlink and uplink;
receiving non-modulated sounding reference signals-from each antenna among the plurality of antennas of the mobile device;
restoring downlink channel information utilizing the modulated sounding reference signals and the non-modulate sounding reference signals; and
performing downlink precoding, at a base station, based at least in part on the restored downlink channel information.

22. The method of claim 21, further comprising generating calibration factors based upon the received modulate sounding reference signals, the calibration factors compensate for discrepancies between downlink and uplink device transfer functions.

23. The method of claim 22, wherein restoring downlink channel information comprises employing the calibration factors on the received non-modulated sounding reference signals.

24. The method of claim 23, further comprising dividing the non-modulated sounding reference signals by the calibration factors.

25. The method of claim 21, further comprising deriving optimal precoding vectors based upon the downlink channel information.

26. The method of claim 21, further comprising utilizing downlink channel noise information to maximize precoding gain.

27. A wireless communications apparatus, comprising:
a memory that retains instructions related to receiving modulated sounding reference signals, the received modulated sounding reference signals are received from each antenna among a plurality of antennas of a mobile device, the modulated sounding reference signals including calibration factors that compensate for discrepancies in device transfer functions between downlink and uplink, receiving non-modulated sounding reference signals from each antenna among the plurality of antennas of the mobile device, restoring downlink channel information utilizing the modulated sounding reference signals and the non-modulate sounding reference signals and performing downlink precoding, at a base station, based at least in part on the restored downlink channel information; and
a processor, coupled to the memory, configured to execute the instructions retained in the memory.

28. The wireless communications apparatus of claim 27, the memory further retains instructions for generating calibration factors based upon the received modulated sounding reference signals, the calibration factors compensate for discrepancies between downlink and uplink device transfer functions.

29. The wireless communications apparatus of claim 27, the memory further retains instructions for deriving optimal precoding vectors based upon the downlink channel information.

30. The wireless communications apparatus of claim 27, the memory further retains instructions for utilizing downlink channel noise information to maximize precoding gain.

31. A wireless communications apparatus for downlink precoding based on sounding channel measurement, comprising:
- means for receiving modulated sounding reference signals, the received modulated sounding reference signals are received from each antenna among a plurality of antennas of a mobile device, the modulated sounding reference signals including calibration factors that compensate for discrepancies in device transfer functions between downlink and uplink;
- means for receiving non-modulated sounding reference signals from each antenna among the plurality of antennas of the mobile device;
- means for restoring downlink channel information utilizing the modulated sounding reference signals and the non-modulate sounding reference signals; and
- means for performing downlink precoding, at a base station, based at least in part on the restored downlink channel information.

32. The wireless communications apparatus of claim 31, further comprising means for generating calibration factors based upon the received modulate sounding reference signals, the calibration factors compensate for discrepancies between downlink and uplink device transfer functions.

33. The wireless communications apparatus of claim 31, means for restoring downlink channel information comprises means for employing the calibration factors on the received non-modulated sounding reference signals.

34. The wireless communications apparatus of claim 33, further comprising means for dividing the non-modulated sounding reference signals by the calibration factors.

35. The wireless communications apparatus of claim 31, further comprising means for deriving optimal precoding vectors based upon the downlink channel information.

36. The wireless communications apparatus of claim 31, further comprising means for utilizing downlink channel noise information to maximize precoding gain.

37. A computer program product, comprising:
a computer-readable medium comprising:
- code for causing at least one computer to receive modulated sounding reference signals, the received modulated sounding reference signals are received from each antenna among a plurality of antennas of a mobile device, the modulated sounding reference signals including calibration factors that compensate for discrepancies in device transfer functions between downlink and uplink;
- code for causing at least one computer to receive non-modulated sounding reference signals from each antenna among the plurality of antennas of the mobile device;
- code for causing at least one computer to restore downlink channel information utilizing the modulated sounding reference signals and the non-modulate sounding reference signals; and
- code for causing at least one computer to perform downlink precoding, as a base station, based at least in part on the restored downlink channel information.

38. The computer program product of claim 37, the computer-readable medium further comprises code for causing at least one computer to generate calibration factors based upon the received modulate sounding reference signals, the calibration factors compensate for discrepancies between downlink and uplink device transfer functions.

39. The computer program product of claim 37, the computer-readable medium further comprises code for causing at least one computer to utilize downlink channel noise information to maximize precoding gain.

40. In a wireless communications system, an apparatus comprising:
a processor configured to:
- receive modulated sounding reference signals, the received modulated sounding reference signals are received from each antenna among a plurality of antennas of a mobile device, the modulated sounding reference signals including calibration factors that compensate for discrepancies in device transfer functions between downlink and uplink;
- receive non-modulated sounding reference signals from each antenna among the plurality of antennas of the mobile device;
- restore downlink channel information utilizing the modulated sounding reference signals and the non-modulate sounding reference signals; and
- perform downlink precoding, at a base station, based at least in part on the restored downlink channel information.

* * * * *